(12) United States Patent
Shen et al.

(10) Patent No.: US 12,199,442 B2
(45) Date of Patent: Jan. 14, 2025

(54) METHOD FOR QUANTIFICATION OF FLEXIBILITY REQUIREMENTS AND COORDINATED OPTIMIZATION OF A HYDRO-WIND-SOLAR MULTI-ENERGY COMPLEMENTARY SYSTEMS

(71) Applicant: DALIAN UNIVERSITY OF TECHNOLOGY, Liaoning (CN)

(72) Inventors: Jianjian Shen, Liaoning (CN); Yue Wang, Liaoning (CN); Chuntian Cheng, Liaoning (CN); Binbin Zhou, Liaoning (CN); Congtong Zhang, Liaoning (CN); Lin Hu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 380 days.

(21) Appl. No.: 17/909,594

(22) PCT Filed: Oct. 19, 2021

(86) PCT No.: PCT/CN2021/124684
§ 371 (c)(1),
(2) Date: Sep. 6, 2022

(87) PCT Pub. No.: WO2023/065113
PCT Pub. Date: Apr. 27, 2023

(65) Prior Publication Data
US 2023/0268742 A1    Aug. 24, 2023

(51) Int. Cl.
*H02J 3/46* (2006.01)
*H02J 3/38* (2006.01)

(52) U.S. Cl.
CPC ............. *H02J 3/46* (2013.01); *H02J 3/381* (2013.01); *H02J 2300/24* (2020.01); *H02J 2300/28* (2020.01)

(58) Field of Classification Search
CPC .......... H02J 3/46; H02J 3/381; H02J 2300/28; H02J 2300/24
See application file for complete search history.

(56) References Cited

U.S. PATENT DOCUMENTS

| 2013/0024243 A1* | 1/2013 | Sharma | G06Q 50/06 |
| | | | 705/7.36 |
| 2016/0281607 A1 | 9/2016 | Asati et al. | |
| 2017/0308968 A1* | 10/2017 | Zhou | H02J 3/00 |

FOREIGN PATENT DOCUMENTS

| CN | 111342486 A | 6/2020 |
| CN | 112467807 A | 3/2021 |
| EP | 3026510 A1 | 6/2016 |

* cited by examiner

*Primary Examiner* — Gary Collins
(74) *Attorney, Agent, or Firm* — MUNCY, GEISSLER, OLDS & LOWE, P.C.

(57) ABSTRACT

The present invention belongs to the field of power system operations and provides a method for quantifying the flexibility demand and coordinating optimization of a hydro-wind-solar multi-energy complementary system. Firstly, the flexibility demand quantification method considering the uncertainty of wind and solar power output is constructed, and the wind and solar power output interval is divided by using quantile points to generate a set of output scenarios, and then the flexibility demand under each scenario is calculated. Based on the quantitative index of flexibility demand, an optimal operation model of hydro-wind-solar complementary system considering the minimum expectation of system flexibility deficiency is constructed to realize the optimal calculation of hydro-wind-solar complementary. By utilizing an actual wind-hydro complementary system of the Yunnan Power Grid, the model is validated for different new energy access ratios. The results show that the method of the present invention can give a complementary operation and scheduling scheme for multiple types of power sources under different conditions, effectively meet the flexibility demand of the system, reduce the abandoned power and improve the level of clean energy integration.

1 Claim, 3 Drawing Sheets

METHOD FOR QUANTIFICATION OF FLEXIBILITY REQUIREMENTS AND COORDINATED OPTIMIZATION OF A HYDRO-WIND-SOLAR MULTI-ENERGY COMPLEMENTARY SYSTEMS

TECHNICAL FIELD

The present invention relates to the field of power system operations, and in particular to a method for quantifying the flexibility demand and coordinating and optimizing a hydro-wind-solar multi-energy complementary system.

TECHNICAL BACKGROUND

In the "carbon peak, carbon neutral" goal, wind, solar and other intermittent renewable energy to the grid-scale will increase sharply, is expected to 2030, 2050, the proportion of new energy installed will reach 38%, 70%, respectively. Such a large-scale intermittent power supply will inevitably lead to a significant increase in the demand for regulatory flexibility in the short-term operation of the power system. How to quantify the uncertainty of wind and solar power generation facing the flexibility needs, how to carry out wind, solar and adjustable power supply short-term complementary operation, has become a major challenge in the construction of new energy-based power system, the matter of China's power system security, stability and clean energy consumption.

For systems with small-scale wind and solar power supply, the use of standby capacity reservation can effectively cope with power and load uncertainties. However, as the proportion of wind and solar power in the system continues to increase, affected by the uncertainty and large fluctuations in its power output, the previous approach to spare capacity may cause a significant increase in system costs, the core issue is how to accurately quantify the demand for flexibility in the consumption of uncertain wind and solar generation. There are already results of studies conducted in this area, and some evaluation indicators have been proposed, which can be generally classified into three categories. The first category is the indexes for evaluating the flexible supply capacity of resources, including climbing capacity, minimum start-stop time, start-up time, response time, minimum stable output, etc., which are mainly used to compare the size of the flexible regulation capacity of different resources and are often used as input parameters for scheduling models. The second category is metrics to evaluate the flexibility needs of the system, including net load creep rate, creep acceleration, etc., which are mainly used to analyze the characteristics of the load curve and quantify the flexibility needs. The third category is the index to evaluate the system flexibility supply and demand, including the flexibility deficiency probability and expectation, which can also be subdivided into upward flexibility deficiency probability and expectation and downward flexibility deficiency probability and expectation, and is mainly used to evaluate the overall flexibility level of the system.

In general, most of the current quantification of flexibility demand focuses on the deterministic level, but due to the uncertainty of wind and solar output, the flexibility demand is actually dynamic in space and time, so it is also very important to consider the stochastic nature of regulating flexibility in the scheduling operation of multiple energy complementary systems. On the other hand, for complementary systems with a large share of intermittent power sources, such as wind and solar power, when the flexibility regulation capacity is insufficient, how to reasonably configure the flexibility regulation capacity on a spatial and temporal multi-dimensional scale is also crucial to maintain the stability of the system and enhance the consumption capacity of new energy generation.

In response to the above problems, this invention proposes a method for evaluating the flexibility and short-term complementary operation of a high percentage of renewable energy power systems with hydro and wind, and solar as the main source, relying on the National Natural Science Foundation of China (52079014) and the actual engineering of Yunnan power grid. The flexibility demand quantification method considering the uncertainty of wind and solar power output is constructed, and the wind and solar power output interval is divided by using quantile points to generate the set of output scenarios, and then the flexibility demand under each scenario is calculated. A hydro-wind-solar complementary optimal dispatching model considering the minimum expectation of system flexibility is constructed, which effectively meets the flexibility demand of large-scale intermittent new energy grid connection and consumption through the complementary and coordinated operation of multiple types of power sources of hydro, wind and solar.

SUMMARY

The invention aims to solve the technical problem of quantifying the demand for flexibility and coordinating optimization of the hydro-wind-solar multi-energy complementary system, to promote the large-scale consumption of clean energy such as wind and solar, and reduce unreasonable wind and solar abandonment.

Technical Solutions of the Invention a method for quantifying flexibility requirements and coordinating optimization of a hydro-wind-solar multi-energy complementary system, includes the following steps.

(1) The power output distribution function of the cluster of wind and solar power is used as a benchmark to convert the power output of the cluster of wind and solar power plants into a series of continuous power output intervals as follows.

step1. According to the probability distribution function of the power output of each period of the wind and solar power cluster, the power output of each period of the power plant cluster corresponding to the a quantile is obtained.

$$L_i^\alpha:\{P_{i,1}^\alpha, P_{i,2}^\alpha, \ldots, P_{i,t}^\alpha, \ldots, P_{i,T}^\alpha\} \quad P_{i,t}^\alpha = F_{i,t}^{-1}(\alpha) \tag{1}$$

where: $L_i^\alpha$ indicates the output of each period of cluster i when the quantile is $\alpha$; $P_{i,t}^\alpha$ indicates the output of cluster i period t when the quantile is $\alpha$, MW; $F_{i,t}^{-1}(\cdot)$ indicates the probability distribution function of the output of cluster i period t.

step2. take a series of quantile points $\{0=\alpha_1<\alpha_2 \ldots <\alpha_m \ldots, <\alpha_{M+1}=1\}$ that is to get the M+1 output curve $L_i^{\alpha_1}, L_i^{\alpha_2}, \ldots, L_i^{\alpha_M}, \ldots L_i^{\alpha_M}$ of the power station cluster.

step3. The probability that the power station cluster output is below $L_i^{\alpha_m}$ is $\alpha_m$, and the probability that it is below $L_i^{\alpha_{m+1}}$ is $\alpha_{m+1}$, so the probability that the cluster output is between $L_i^{\alpha_m}$ and $L_i^{\alpha_{m+1}}$ is expressed as $\alpha_{m+1}-\alpha_m$; according to the above method, the cluster output intervals with different probabilities are obtained as follows.

$$L_i^{\alpha_1} \le L \le L_i^{\alpha_2} \to \alpha_2 - \alpha_1 \qquad (2)$$

$$L_i^{\alpha_2} \le L \le L_i^{\alpha_3} \to \alpha_3 - \alpha_2$$

$$\vdots$$

$$L_i^{\alpha_m} \le L \le L_i^{\alpha_{m+1}} \to \alpha_{m+1} - \alpha_m$$

$$\vdots$$

$$L_i^{\alpha_M} \le L \le L_i^{\alpha_{M+1}} \to \alpha_{M+1} - \alpha_M$$

(2) Generate the scenario set of wind and solar power cluster output as follows.

step1. For the above-obtained output interval, when the adjacent quantile points $\alpha_m$ and $\alpha_{m+1}$ take values closer, the width of the output interval between $L_j^{\alpha_m}$ and $L_i^{\alpha_{m+1}}$ will be smaller, so take the center line $Z_j^m$ of $L_i^{\alpha_m}$ and $L_i^{\alpha_{m+1}}$ to represent the output area between the two, see the following equation.

$$Z_i^m : \{P_{i,1}^m, P_{i,2}^m, \ldots, P_{i,t}^m, \ldots, P_{i,T}^m\} \qquad (3)$$

$$P_{i,t}^m = \frac{(P_{i,t}^{\alpha_m} + P_{i,t}^{\alpha_{m+1}})}{2}$$

Step2. $\alpha_1=0$, $\alpha_2=0.01$, $\alpha_3=0.02$, ..., $\alpha_M=1$ is taken, from which a series of power plant clustering out scenarios and their corresponding probabilities are obtained.

$$\{Z_i^1\} \to Pr_{i,1} = \alpha_2 - \alpha_1 \qquad (4)$$

$$\{Z_i^2\} \to Pr_{i,2} = \alpha_3 - \alpha_2$$

$$\vdots$$

$$\{Z_i^m\} \to Pr_{i,m} = \alpha_{m+1} - \alpha_m$$

$$\vdots$$

$$\{Z_i^M\} \to Pr_{i,M} = \alpha_{M+1} - \alpha_M$$

(3) flexibility demand for intermittent power generation from wind and solar power; for cluster output scenario m, if the actual output for a certain period of the scenario is greater than the planned output, the flexibility downward demand for that period is expressed as equation (6), and the flexibility upward demand at this time is 0. On the contrary, if the capacity of the scenario for a certain period is less than the planned capacity, the flexibility upward demand for that period is expressed as equation (5), and the flexibility downward demand is 0.

$$D_{i,m,t}^{UR} = \max(P_{i,t} - P_{i,t}^m, 0) \qquad (5)$$

$$D_{i,m,t}^{DR} = \max(P_{i,t}^m - P_{i,t}, 0) \qquad (6)$$

where: $D_{i,m,t}^{UR}$ indicates the flexibility up-regulation demand of power plant cluster i for the mth scenario at time period t, MW; $D_{i,m,t}^{DR}$ indicates the flexibility down-regulation demand of power plant cluster i for the mth scenario time period t, MW; $P_{i,t}$ indicates the planned output of cluster I at time period t, MW.

(4) calculate the flexibility evaluation index of intermittent wind and solar power generation; this method proposes two indexes: insufficient expectations for upward flexibility and downward flexibility. The insufficient expectation for upward flexibility indicates the probability that the capacity for upward flexibility available in the system at any moment t cannot meet the demand for wind and solar power consumption, see equation (7). The insufficient expectation for downward flexibility indicates the probability that the capacity for downward flexibility available in the system at any moment t cannot meet the demand for wind and solar power consumption, see equation (8).

$$S_{i,t}^{UR} = \Sigma_{m \in \varphi_{UR}}(D_{i,m,t}^{UR} - CA_{i,t}^{UR})Pr_{i,m} \qquad (7)$$

$$S_{i,t}^{DR} = \Sigma_{m \in \varphi_{UR}}(D_{i,m,t}^{UR} - CA_{i,t}^{UR})Pr_{i,m} \qquad (8)$$

where $S_{i,t}^{UR}$ indicates the insufficient expectation for upward flexibility of cluster i at time period t, MW; $Pr_{i,m}$ indicates the probability of scenario m; and $CA_{i,t}^{UR}$ indicates the flexibility up-regulation capacity provided by flexibility resources for cluster i at time period t, MW. $S_{i,t}^{DR}$ indicates the insufficient expectation for downward flexibility of cluster i at time period t, MW; $Pr_{i,m}$ indicates the probability of scenario m; and $CA_{i,t}^{DR}$ indicates the capacity for upward flexibility provided by flexibility resources for cluster i at period t, MW.

(5) construct a short-term complementary flexibility coordination model for a cluster of hydro-wind-solar power, using the minimum expected goal of insufficient flexibility, the purpose is to minimize the insufficient system flexibility brought about by the integration of large-scale wind and solar power generation through the operation of multiple complementary hydroand wind and solar power sources, see the following equation.

$$\min \Sigma_{i=1}^{I} \Sigma_{t=1}^{T}(S_{i,t}^{UR} + S_{i,t}^{DR})/T \qquad (9)$$

(6) the above model is solved using mixed-integer linear programming to obtain the power generation output process of each type of power plants.

Most of the current quantification of flexibility demand focuses on the deterministic level, but due to the uncertainty of wind and solar power output, the flexibility demand is actually dynamic in space and time, so it is also very important to consider the stochastic nature of regulating flexibility in the scheduling operation of multiple energy complementary systems. On the other hand, for complementary systems with a large share of intermittent power sources, such as wind and solar power plants, when the flexibility regulation capacity is insufficient, how to reasonably configure the flexibility regulation capacity on a spatial and temporal multi-dimensional scale is also crucial to maintain the stability of the system and enhance the consumption capacity of new energy generation The results of the present invention have the following beneficial effects: compared with most current quantification methods focusing on flexibility demand at the deterministic level, the present invention takes into account the uncertain power output characteristics of the cluster of wind and solar power. Based on the probability distribution of power output from the cluster of wind and solar power, the interval of power output and the probability of occurrence are obtained by using the quantile point method, and the centerline instead of the interval is used to generate a series of power output scenario sets, thus achieving an accurate quantification of the flexibility demand facing the power generation plan. This approach can fully consider the intermittent and fluctuating power output of wind power plants and photovoltaic power plants in intra-day time sequence, rely on the high-quality regulating role of hydropower plants, meet the needs of clean energy consumption under different new energy access ratio conditions, dynamically respond to the differentiated flexibility needs, reduce the amount of abandoned wind and solar, and improve the level of clean energy consumption of the whole system.

FIGURE LEGENDS

SPECIFIC IMPLEMENTATION WAY

Figure 1:
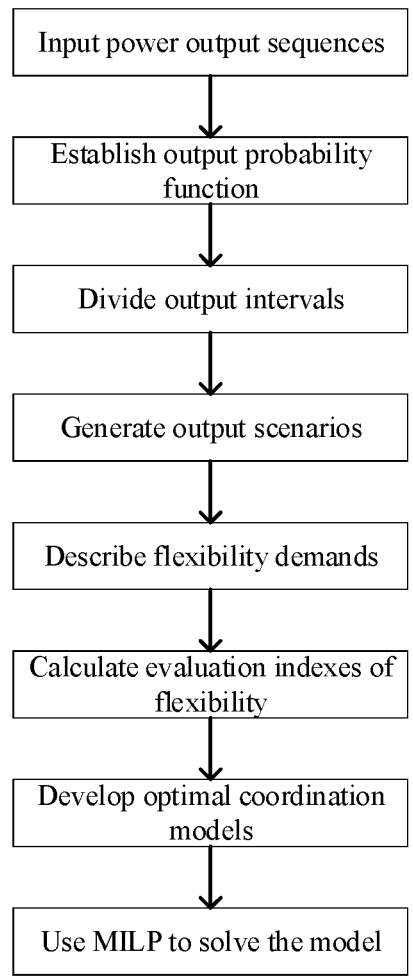
FIG. 1 is a diagram of the general solution framework of the method of the invention.

The specific embodiments of the invention are further described below in conjunction with the accompanying drawings and technical solutions.

The power output distribution function of the cluster of wind and solar power is used as a benchmark to convert the power output of the cluster of wind and solar power plants into a series of continuous power output intervals as follows.

step1. According to the probability distribution function of the power output of each period of the wind and solar power cluster, the power output of each period of the power plant cluster corresponding to the a quantile is obtained.

$$L_i^{\alpha}:\{P_{i,1}^{\alpha}, P_{i,2}^{\alpha}, \ldots, P_{i,t}^{\alpha}, \ldots, P_{i,T}^{\alpha}\} P_{i,t}^{\alpha}=F_{i,t}^{-1}(\alpha) \quad (10)$$

where: $L_i^{\alpha}$ indicates the output of each period of cluster i when the quantile is $\alpha$; $P_{i,t}^{\alpha}$ indicates the output of cluster i period t when the quantile is $\alpha$, MW; $F_{i,t}^{-1}(\cdot)$ indicates the probability distribution function of the output of cluster i period t.

step2. take a series of quantile points $\{0=\alpha_1<\alpha_2\ldots,<\alpha_m\ldots,<\alpha_{M+1}=1\}$ that is to get the M+1 output curve $L_i^{\alpha_1}, L_i^{\alpha_2}, \ldots L_i^{\alpha_m}, L_i^{\alpha_M}$ of the power station cluster.

step3. The probability that the power station cluster output is below $L_i^{\alpha_m}$ is $\alpha_m$, and the probability that it is below $L_i^{\alpha_{m+1}}$ is $\alpha_{m+1}$, so the probability that the cluster output is between $L_i^{\alpha_m}$ and $L_i^{\alpha_{m+1}}$ is expressed as $\alpha_{m+1}-\alpha_m$; according to the above method, the cluster output intervals with different probabilities are obtained as follows.

$$L_i^{\alpha_1} \leq L \leq L_i^{\alpha_2} \rightarrow \alpha_2 - \alpha_1 \quad (11)$$

$$L_i^{\alpha_2} \leq L \leq L_i^{\alpha_3} \rightarrow \alpha_3 - \alpha_2$$

$$\vdots$$

$$L_i^{\alpha_m} \leq L \leq L_i^{\alpha_{m+1}} \rightarrow \alpha_{m+1} - \alpha_m$$

$$\vdots$$

$$L_i^{\alpha_M} \leq L \leq L_i^{\alpha_{M+1}} \rightarrow \alpha_{M+1} - \alpha_M$$

For the above to get out the output interval, when the adjacent quantile points $\alpha_m$ and $\alpha_{m+1}$ take values closer, the width of the interval between $L_i^{\alpha_m}$ and $L_i^{\alpha_{m+1}}$ will be smaller, at this time can take $L_i^{\alpha_m}$ and $L_i^{\alpha_{m+1}}$ centerline $Z_i^m$ approximate representation of the region between the two, the calculation formula is as follows.

$$Z_i^m:\{P_{i,1}^m, P_{i,2}^m, \ldots, P_{i,t}^m, \ldots, P_{i,T}^m\} \quad (12)$$

$$P_{i,t}^m = \frac{(P_{i,t}^{\alpha_m} + P_{i,t}^{\alpha_{m+1}})}{2}$$

It is proposed to set the quantile points in steps of 0.01, i.e., to take $\alpha_1=0, \alpha_2=0.01, \alpha_3=0.02, \ldots, \alpha_M=1$. from which a series of power output scenarios and their corresponding probabilities are obtained.

$$\{Z_i^1\} \rightarrow Pr_{i,1} = \alpha_2 - \alpha_1 \quad (13)$$

$$\{Z_i^2\} \rightarrow Pr_{i,2} = \alpha_3 - \alpha_2$$

$$\vdots$$

$$\{Z_i^m\} \rightarrow Pr_{i,m} = \alpha_{m+1} - \alpha_m$$

$$\vdots$$

$$\{Z_i^M\} \rightarrow Pr_{i,M} = \alpha_{M+1} - \alpha_M$$

Figure 2:
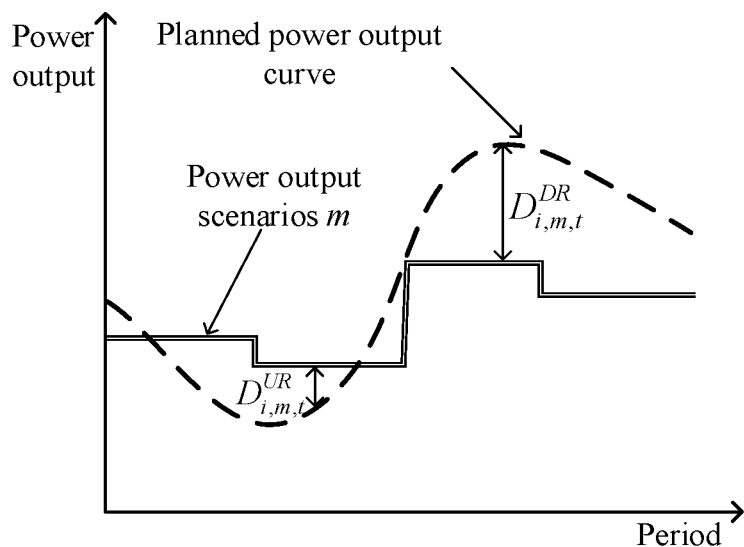
FIG. 2 illustrates the flexibility requirements.

Taking scenario m as an example, if the output of this scenario is greater than the planned output at a certain moment, the flexibility downward demand at that moment can be expressed as equation (14), and the flexibility upward demand at this time is 0. On the contrary, if the output of the scenario is less than the planned output at a certain moment, the flexibility upward demand at that moment can be expressed as equation (15), and the flexibility downward demand is zero, see FIG. 2.

$$D_{i,m,t}^{UR} = \max(P_{i,t} - P_{i,t}^m, 0) \quad (14)$$

$$D_{i,m,t}^{DR} = \max(P_{i,m,t}^{UR} - P_{i,t}, 0) \quad (15)$$

where $D_{i,m,t}^{UR}$ indicates upward flexibility demand of cluster i at mth scenario moment t, MW; $D_{i,m,t}^{UR}$ indicates downward flexibility demand of cluster i at mth scenario moment t, MW; and $P_{i,t}$ indicates the planned output of cluster i at moment t, MW.

Considering the contradiction between the rapidly increasing flexibility demand of intermittent power sources fed into the grid and the limited adjustable resources of the system, the flexibility of the power system is evaluated by using the insufficient expectation for upward and downward flexibility.

The insufficient expectation for upward flexibility is the expectation of the difference between the upward flexibility demand and the upward flexibility capacity at time t due to insufficient upward capacity and is calculated as follows.

$$S_{i,t}^{UR} = \Sigma_{m \in \varphi_{UR}}(D_{i,m,t}^{UR} - CA_{i,t}^{UR})Pr_{i,m} \quad (16)$$

where $S_{i,t}^{UR}$ indicates the insufficient expectation for upward flexibility of cluster i at time period t, MW; $Pr_{i,m}$ indicates the probability of scenario m; and $CA_{i,t}^{UR}$ indicates the upward flexibility capacity provided by flexibility resources for cluster i at time period t, MW.

The insufficient expectation for downward flexibility is the expectation of the difference between the downward flexibility demand and the downward flexibility capacity due to insufficient downward capacity at time t, calculated as follows.

$$S_{i,t}^{DR} = \Sigma_{m \in \varphi_{UR}}(D_{i,m,t}^{DR} - CA_{i,t}^{DR})Pr_{i,m} \quad (17)$$

where $S_{i,t}^{DR}$ indicates the insufficient expectation for downward flexibility of cluster i at time period t, MW; $Pr_{i,m}$ indicates the probability of scenario m; and $CA_{i,t}^{DR}$ indicates the downward flexibility capacity provided by flexibility resources for cluster i at time period t, MW.

The smaller the insufficient expectation of flexibility means the smaller the impact of intermittent new energy grid connection on the stable operation. Thus, a short-term complementary flexibility coordination model is constructed for a cluster of hydro-wind-solar system, using the minimum expected goal of insufficient flexibility, the purpose is to minimize the insufficient system flexibility brought about by the integration of large-scale wind and solar power generation through the operation of multiple complementary hydro and wind and solar power sources, see the following equation.

$$\min \Sigma_{i=1}^{I} \Sigma_{t=1}^{T} (S_{i,t}^{UR} + S_{i,t}^{DR})/T \quad (18)$$

The constraints are as follows:
Flexible Supply and Demand $$CA_{i,t}^{UR} \geq D_{i,m,t}^{UR} CA_{i,t}^{DR} \geq D_{i,m,t}^{UR} \quad (19)$$

Flexibility Adjustment Ability $$\sum_{i=1}^{I} CA_{i,t}^{UR} \leq \sum_{n=1}^{N} C_{n,t}^{UR} \quad (20)$$

$$\sum_{i=1}^{I} CA_{i,t}^{DR} \leq \sum_{n=1}^{N} C_{n,t}^{DR}$$

Where $C_{n,t}^{UR}$ and $C_{n,t}^{DR}$ indicate the upward flexibility capacity and downward flexibility capacity that hydropower plant n can provide at moment t, MW, respectively. The calculation formula is as follows.

$$C_{n,t}^{UR} = \min(N_n^{ramp}, N_{n,t}^{max} - N_{n,t}^{min}) C_{n,t}^{DR} = \min(N_n^{ramp}, N_{n,t} - N_{n,t}^{min}) \quad (21)$$

Where $N_{n,t}^{min}$ and $N_{n,t}^{max}$ indicate the lower and upper limits of the output of the nth hydropower plant at period t, MW, respectively; $N^{n,t}$ indicates the output of hydropower plant n at time t, MW; $N_n^{ramp}$ indicates the climbing capacity of hydropower plant n, MW.

Water Balance Constraint $$V_{n,t+1} = V_{n,t} + 3600(QI_{n,t} - QU_{n,t})\Delta t \ QU_{n,t} = QD_{n,t} + QS_{n,t} \quad (22)$$

Where $V_{n,t+1}, V_{n,t}$ indicate the reservoir capacity of the nth hydropower station at the period t+1 and t, respectively, $m^3$. $QI_{n,t}$ indicates the incoming flow of the nth hydropower plant in period $$t, \frac{m^3}{s};$$

$QU_{n,t}$ indicates the outgoing flow of the nth hydropower plant in period $$t, \frac{m^3}{s}.$$

$\Delta t$ indicates the number of hours in period t; $QD_{n,t}$ indicates the generation flow of the nth hydropower plant in period $$t, \frac{m^3}{s};$$

$QS_{n,t}$ indicates the disposal flow of the nth hydropower plant in period $$t, \frac{m^3}{s}.$$

Beginning and Ending Water Level Constraints $$Z_{n,1} = Z_n^S Z_{n,T+1} = Z_n^E \quad (23)$$

Where $Z_{n,1}, Z_{n,T+1}$ indicate the water level at the beginning and end of the dispatching period of the nth hydropower station, m, respectively; $Z_n^S, Z_n^E$ indicate the water level at the beginning and ending periods of the operation horizon of the given nth hydropower station, m, respectively. water level constraints $$Z_{n,t}^{min_{n,t}^{max}} \quad (24)$$

Where $Z_{n,t}$ indicates the water level of the nth hydropower station at time t, m; $Z_{n,t}^{min}$ and $Z_{n,t}^{max}$ a indicate the lower limit of water level and upper limit of water level of the nth hydropower station at time t, m, respectively.

Power Generation Flow Constraints $$QD_{n,t}^{min_{n,t}^{max}} \quad (25)$$

Where $QD_{n,t}$ indicates the power generation flow of the nth hydropower plant in period $$t, \frac{m^3}{s};$$

$QD_{n,t}^{min}$ and $QD_{n,t}^{max}$ indicate the minimum and maximum power generation flow of the nth hydropower plant in period $$t, \frac{m^3}{s},$$

respectively.
Discharge Flow Constraints $$QU_{n,t}^{min_{n,t}^{max}} \quad (26)$$

Where $QU_{n,t}$ indicates the generation flow of the nth hydropower station in period $$t, \frac{m^3}{s};$$

$QU_{n,t}^{min}$ and $QU_{n,t}^{max}$ indicate the lower and upper limits of the outgoing flow of the nth hydropower station in period $$t, \frac{m^3}{s},$$

respectively.

Hydroelectric Power Plant Output Constraints $$N_{n,t}^{min_{n,t},max_{n,t}} \quad (27)$$

Where $N_{n,t}$ indicates the output of the nth hydropower plant in period t, MW; $N_{n,t}^{min}$ and $N_{n,t}^{max}$ indicate the lower and upper limits of the output of the nth hydropower plant in period t, MW, respectively.

Hydroelectric Power Plant Output Climbing Constraint $$|N_{n,t+1} - N_{n,t}| \leq N_n^{ramp} \quad (28)$$

Where $N_{n,t+1}$ and $N_{n,t}$ indicate the output of the nth hydropower plant in period t+1 and period t, respectively, MW; $N_n^{ramp}$ indicates the climbing capacity of the nth hydropower plant, MW.

Peaking Control Demand $$R^{max} - R^{min} \leq \Delta R \quad (29)$$

$$R^{max} = \max_{t=1,2,\ldots,T} R_t, \quad R^{min} = \min_{t=1,2,\ldots,T} R_t$$

$$R_t = PL_t - \sum_{i=1}^{I} P_{i,t} - \sum_{n=1}^{N} N_{n,t}$$

Where $R^{max}$ and $R^{min}$ indicate the maximum and minimum values of residual load, MW, respectively; $\Delta R$ indicates the residual load peak-valley difference control demand, MW; $R_t$ indicates the residual load in period t, MW; $PL_t$ indicates the total system load in period t, MW.

The above model is solved using mixed-integer linear programming to obtain the day-ahead 96-point output process of each power station.

The model method of the present invention is analyzed and verified in the context of the actual engineering of the Yunnan power grid. Yunnan is a clean energy-rich region in China, with a total exploitable clean energy of about 200 million kW, including 97.95 million kW of hydro energy reserves, ranking second in the country, 123 million kW of wind energy resources, and 2.14×10 MJ/a of solar energy resources, ranking third in the country. By the end of 2020, the installed capacity of hydropower, wind power and photovoltaic power in Yunnan was 75.56 million kW, 8.95 million kW and 3.51 million kW respectively, accounting for 88% of the total installed capacity and over 90% of the power generation, making it a dominant provincial grid for clean energy. The data used to construct the probability distribution function of the cluster of wind and solar power in this invention are the historical measured output of the month to which the typical day belongs, and the model input parameters are derived from the actual parameters of the power plants.

Due to the increasing demand for electricity and the call of national policy, the future will continue to vigorously develop wind and solar energy, the proportion of intermittent energy access to the grid will further increase. Therefore, it is necessary to analyze the flexibility regulation relationship under different new energy installation ratio scenarios. For this reason, the invention selects the new energy installation ratio of 10% to 70% respectively for comparative analysis. The abandonment rate (abandoned power/total power generation) indicator was introduced to indicate the utilization of new energy sources with the following calculation formula.

$$P_{ab} = \frac{\sum_t EB_t}{\sum_t E_t} \quad (1)$$

Where $EB_t$ indicates the actual amount of wind and solar abandoned due to insufficient flexibility regulation capacity in time t, kWh. $E_t$ indicates the total generation capacity of the wind and solar power plant in period t, kWh.

Figure 3:
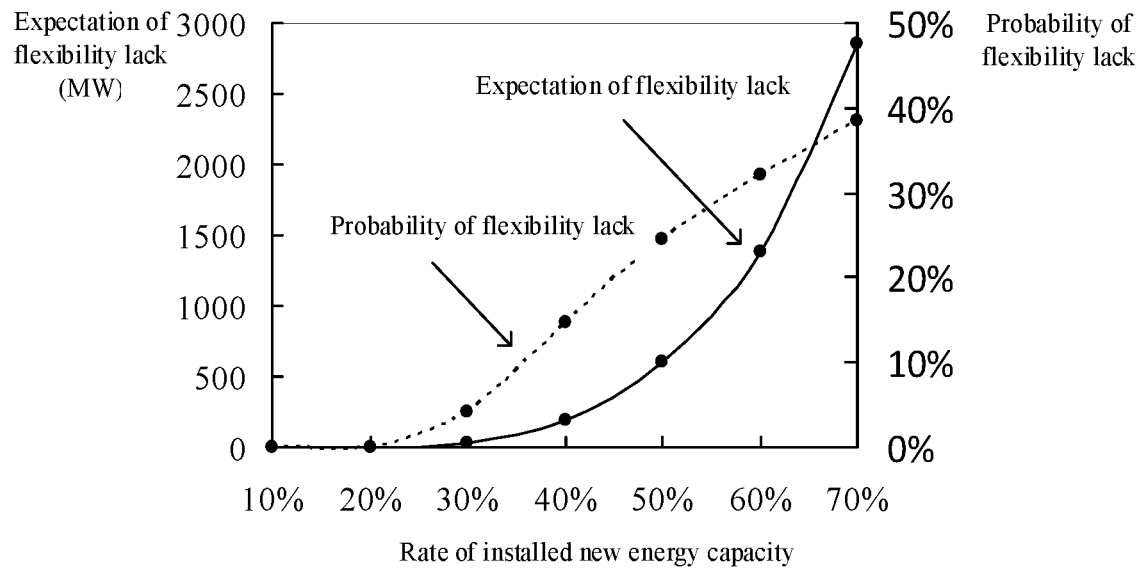
FIG. 3 shows a graph of the variation pattern of flexibility deficit expectation and flexibility deficit probability with the share of new energy installations.

Table 1 shows the flexibility indicators for different new energy installation ratio scenarios. It can be seen that when the proportion of new energy installations is less than 20%, the flexibility demand can be met; when the proportion of new energy installations reaches 30%, the flexibility regulation deficiency expectation is 26.1 MW, and the flexibility regulation deficiency probability is 4.22%, and the regulation flexibility gap is relatively small. When the proportion of new energy installations reaches 30% or more, the expectation and probability of insufficient flexibility regulation increase as the proportion of new energy installations increases due to the limited flexibility regulation capability of hydropower. And in a typical day verification, the abandonment rate increases. Although the percentage of abandonment is small, it is very significant for the huge amount of power generation. FIG. 3 shows the trends of flexibility deficiency expectation and probability under different new energy installation ratios. It can be seen that after the new energy installation ratio exceeds 20%, the system flexibility deficiency probability increases roughly linearly with the new energy installation ratio, and the flexibility deficiency expectation increases roughly quadratically with the new energy installation ratio.

TABLE 1

Calculation results under different new energy installation ratio

| Percentage of new energy installations | Inflexibility expectations (MW) | Probability of inflexibility | Abandoned power rate |
|---|---|---|---|
| 10% | 0 | 0 | 0 |
| 20% | 0 | 0 | 0 |
| 30% | 26.1 | 4.22% | 0 |
| 40% | 193.0 | 14.60% | 0.66% |
| 50% | 598.5 | 24.39% | 3.11% |
| 60% | 1377.9 | 32.21% | 6.27% |
| 70% | 2855.1 | 38.54% | 11.74% |

Combining the above calculation and analysis results, the wind and solar limit capacity that the power system can accept under the current flexibility level is about 30% of the total installed capacity of the system. If the ratio is higher than this, the system flexibility regulation capacity will be seriously insufficient, threatening the safe and stable operation of the power system and generating a large amount of abandoned wind and solar. This result can provide decision support for the grid's future planning of installed capacity of new energy power plants such as wind and solar power.

Due to the complementary nature of the wind and solar power output, different ratios of wind and solar power output characteristics differ greatly, so the impact on the power system is not the same, to study the impact of different wind and solar installation ratios on the flexibility of the power system. This section focuses on the impact of the installed ratio of wind and solar power generation on the results. For analysis, wind and solar power plants with different installed ratios are brought together as a cluster for study, and the installed ratio of wind and solar power is set at 30%. For ease of exposition, the wind and solar scale factor λ is defined and calculated as follows.

$$\lambda = \frac{P_W}{P_W + P_S} \quad (2)$$

Where $P_W, P_S$ indicate the installed capacity of wind power plant and photovoltaic power plant respectively.

Figure 4:
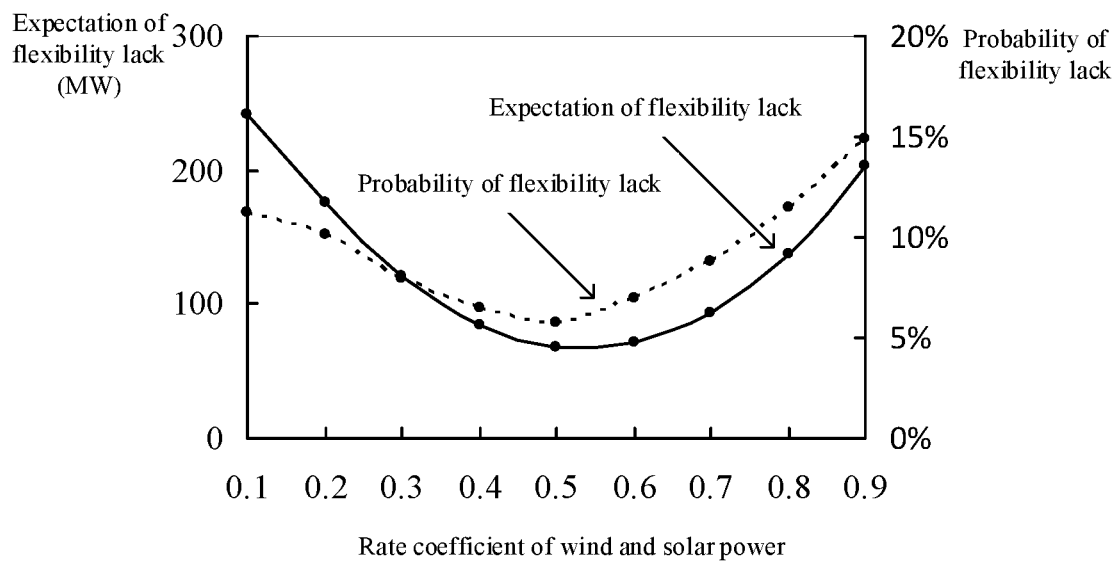
FIG. 4 shows a graph of the variation pattern of flexibility deficit expectation and flexibility deficit probability with the wind and solar scale factors.
Figure 5:
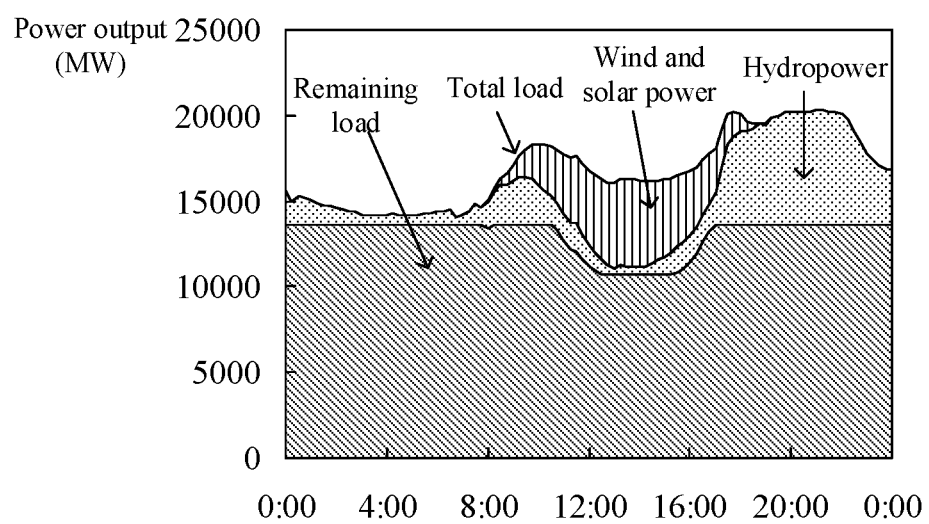
FIG. 5 shows the daily load balance of a typical day during the dry period.

Table 2 shows the flexibility regulation under-expectation and probability for different wind and solar scale factors, and it can be seen that the system has the least flexibility regulation under-expectation when the wind and solar scale factor is between 0.5 and 0.6. FIG. 4 gives the flexibility deficiency expectation and the flexibility deficiency probability with the wind and solar ratio coefficient change law, it can be seen that the flexibility deficiency expectation and the flexibility deficiency probability with the wind and solar ratio coefficient change law are the same, that is, with the wind and solar ratio coefficient becomes larger first decrease and then increase, the reason is that when the installed PV power generation accounted for a relatively large impact on the shape of the load curve, will increase the peak and valley difference of system load, as shown in FIG. 5. To achieve peak control demand, hydropower plants will operate with smaller output at low load valleys, so the shortage of flexibility down-regulation capacity is larger; when the installed wind power accounts for a larger proportion, the flexibility demand is greater due to the greater uncertainty of wind power, which will also lead to the lack of flexibility regulation capacity of the system. The above-mentioned results show that the impact of the different installed ratios of wind and solar power generation on the dispatch of power systems is different, and in practical application, it is necessary to determine the suitable installed ratio of new energy generation in combination with specific projects.

TABLE 2

Expectation and probability of insufficient flexibility with different wind and solar scaling factors

| Wind and solar scale factor | Insufficient flexibility to adjust expectations (MW) | Flexibility to adjust for insufficient probability |
| --- | --- | --- |
| 0.1 | 241.0 | 11.26% |
| 0.2 | 174.7 | 10.09% |
| 0.3 | 120.6 | 7.97% |
| 0.4 | 84.3 | 6.49% |
| 0.5 | 67.8 | 5.79% |
| 0.6 | 70.9 | 6.95% |
| 0.7 | 93.3 | 8.81% |
| 0.8 | 136.8 | 11.49% |
| 0.9 | 202.3 | 14.85% |

The invention claimed is:

1. A method for quantifying flexibility requirements and coordinating optimization of a hydro-wind-solar multi-energy complementary system, wherein comprising the following steps:
   (1) a power output distribution function of wind and solar power plant clusters is used as a benchmark to convert a power output of cluster of wind and solar power plants into a series of continuous power output intervals as follows:
   step1. according to a probability distribution function of the power output of each time period of the wind and solar power cluster, the power output of each time period of the power plant cluster corresponding to the quantile α is obtained:

$$L_i^\alpha : \{P_{i,1}^\alpha, P_{i,2}^\alpha, \ldots, P_{i,t}^\alpha, \ldots, P_{i,T}^\alpha\}$$

$$P_{i,t}^\alpha = F_{i,t}^{-1}(\alpha) \quad (1)$$

where $L_i^\alpha$ indicates the output of each period of cluster i when the quantile is α; $P_{i,t}^\alpha$ indicates the output of cluster i period t when the quantile is α, MW; $F_{i,t}^{-1}(\cdot)$ indicates the probability distribution function of the output of cluster i period t;

step2. taking a series of quantile points $\{0=\alpha_1 < \alpha_2 \ldots < \alpha_m \ldots, < \alpha_{M+1} = 1\}$ that is to get M+1 output curve $L_i^{\alpha_1}, L_i^{\alpha_2}, \ldots L_i^{\alpha_m}, \ldots L_i^{\alpha_M}$ of the power station cluster;

step3. the probability that the power station cluster output is below $L_i^{\alpha_m}$ is $\alpha_m$, and the probability that it is below $L_i^{\alpha_{m+1}}$ is $\alpha_{m+1}$, so the probability that the cluster output is between $L_i^{\alpha_m}$ and $L_i^{\alpha_{m+1}}$ is expressed as $\alpha_{m+1} - \alpha_m$; according to the above method, the cluster output intervals with different probabilities are obtained as follows:

$$L_i^{\alpha_1} \leq L \leq L_i^{\alpha_2} \to \alpha_2 - \alpha_1 \quad (2)$$
$$L_i^{\alpha_2} \leq L \leq L_i^{\alpha_3} \to \alpha_3 - \alpha_2$$
$$\vdots$$
$$L_i^{\alpha_m} \leq L \leq L_i^{\alpha_{m+1}} \to \alpha_{m+1} - \alpha_m$$
$$\vdots$$
$$L_i^{\alpha_M} \leq L \leq L_i^{\alpha_{M+1}} \to \alpha_{M+1} - \alpha_M$$

(2) generating scenario sets of wind and solar power cluster output as follows;
   step1. for the above-obtained power output interval, when adjacent quantile points $\alpha_m$ and $\alpha_{m+1}$ take values are closer, width of output interval between $L_i^{\alpha_m}$ and $L_i^{\alpha_{m+1}}$ will be smaller, so take center line $Z_i^m$ of $L_i^{\alpha_m}$ and $L_i^{\alpha_{m+1}}$ to represent the output area between the two, see the following equation:

$$Z_i^m : \{P_{i,1}^m, P_{i,2}^m, \ldots, P_{i,t}^m, \ldots, P_{i,T}^m\} \quad (3)$$

$$P_{i,t}^m = \frac{\left(P_{i,t}^{\alpha_m} + P_{i,t}^{\alpha_{m+1}}\right)}{2}$$

step2. $\alpha_1 = 0, \alpha_2 = 0.01, \alpha_3 = 0.02, \ldots, \alpha = 1$ is taken, from which a series of power plant clustering out scenarios and their corresponding probabilities are obtained:

$$\{Z_i^1\} \to Pr_{i,1} = \alpha_2 - \alpha_1 \quad (4)$$
$$\{Z_i^2\} \to Pr_{i,2} = \alpha_3 - \alpha_2$$
$$\vdots$$
$$\{Z_i^m\} \to Pr_{i,m} = \alpha_{m+1} - \alpha_m$$
$$\vdots$$
$$\{Z_i^M\} \to Pr_{i,M} = \alpha_{M+1} - \alpha_M$$

(3) flexibility demand for intermittent wind and solar power; for cluster output scenario m, if an actual output at a certain period of the scenario is greater than a planned output, a flexibility downward demand for that period is expressed as equation (6), and a flexibility upward demand at this time is 0; on the contrary, if the capacity of a scenario for a certain period is less than a planned capacity, the flexibility upward demand for that period is expressed as equation (5), and the flexibility downward demand is 0;

$$D_{i,m,t}^{UR}=\max(P_{i,t}-P_{i,t}^{m},0) \quad (5)$$

$$D_{i,m,t}^{DR}=\max(P_{i,t}^{m}-P_{i,t},0) \quad (6)$$

where $D_{i,m,t}^{UR}$ indicates the upward flexibility demand of power plant cluster i for the mth scenario at period t, MW; $D_{i,m,t}^{DR}$ indicates the flexibility down-regulation demand of power plant cluster i for the mth scenario at period t, MW; $P_{i,t}$ indicates the planned output of cluster i at period t, MW;

(4) calculating the flexibility evaluation index of intermittent wind and solar power generation; this method proposes two indexes: insufficient expectations for upward flexibility and downward flexibility; the insufficient expectation for upward flexibility indicates the probability that the capacity for upward flexibility available in the system at any moment t cannot meet the demand for wind and solar power consumption, see equation (7); the insufficient expectation for downward flexibility indicates the probability that the capacity for downward flexibility available in the system at any moment t cannot meet the demand for wind and solar power consumption, see equation (8):

$$S_{i,t}^{UR}=\Sigma_{m\in\varphi_{UR}}(D_{i,m,t}^{UR}-CA_{i,t}^{UR})Pr_{i,m} \quad (7)$$

$$S_{i,t}^{DR}=\Sigma_{m\in\varphi_{UR}}(D_{i,m,t}^{DR}-CA_{i,t}^{DR})Pr_{i,m} \quad (8)$$

where $S_{i,t}^{UR}$ indicates the insufficient expectation for upward flexibility of cluster i at time period t, MW; $Pr_{i,m}$ indicates the probability of scenario m; and $CA_{i,t}^{UR}$ indicates the flexibility capacity provided by flexibility resources for cluster i at time period t, MW; $S_{i,t}^{DR}$ indicates the insufficient expectation for downward flexibility of cluster i at time period t, MW; $Pr_{i,m}$ indicates the probability of scenario m; and $CA_{i,t}^{DR}$ indicates the capacity for upward flexibility provided by flexibility resources for cluster i at period t, MW;

(5) constructing a short-term complementary flexibility coordination model for a cluster of hydro-wind-solar system, using a minimum expected goal of insufficient flexibility, a purpose is to minimize the insufficient flexibility brought about by the consumption of large-scale wind and solar power generation through the operation of multiple complementary system with hydro, wind and solar power sources, see the following equation:

$$\min \Sigma_{i=1}^{I}\Sigma_{t=1}^{T}(S_{i,t}^{UR}+S_{i,t}^{DR})/T \quad (9)$$

(6) the above model is solved using mixed-integer linear programming to obtain the power generation output process of each type of power plants.

* * * * *